(12) United States Patent
Kobayashi (10) Patent No.: US 9,130,207 B2
(45) Date of Patent: Sep. 8, 2015

(54) LOCKING STRUCTURE FOR COVER

(75) Inventor: Yasushi Kobayashi, Kawasaki (JP)

(73) Assignee: NEC CORPORATION, Tokyo (JP)

( * ) Notice: Subject to any disclaimer, the term of this patent is extended or adjusted under 35 U.S.C. 154(b) by 213 days.

(21) Appl. No.: 13/885,601

(22) PCT Filed: Aug. 29, 2011

(86) PCT No.: PCT/JP2011/004790
§ 371 (c)(1),
(2), (4) Date: May 15, 2013

(87) PCT Pub. No.: WO2012/066707
PCT Pub. Date: May 24, 2012

(65) Prior Publication Data
US 2013/0236762 A1    Sep. 12, 2013

(30) Foreign Application Priority Data
Nov. 16, 2010    (JP) .................................. 2010-255910

(51) Int. Cl.
*H01M 2/10* (2006.01)
*H04M 1/02* (2006.01)

(52) U.S. Cl.
CPC .......... *H01M 2/1022* (2013.01); *H01M 2/1066* (2013.01); *H04M 1/026* (2013.01); *H04M 1/0262* (2013.01)

(58) Field of Classification Search
CPC . H01M 2/1022; H01M 2/1066; H01M 1/026; H01M 1/0262
USPC ........................................................ 429/100
See application file for complete search history.

(56) References Cited

U.S. PATENT DOCUMENTS

| 8,027,157 B2 | 9/2011 | Shen et al. |
| 2009/0239140 A1 | 9/2009 | Shen et al. |
| 2009/0290303 A1 | 11/2009 | Guo et al. |
| 2010/0055551 A1 * | 3/2010 | Ng .................................. 429/100 |
| 2010/0109345 A1 * | 5/2010 | Wu et al. .......................... 292/19 |

FOREIGN PATENT DOCUMENTS

| CN | 101540385 A | 9/2009 |
| CN | 101587946 A | 11/2009 |

(Continued)

OTHER PUBLICATIONS

English Translation of JP-08293905A.*

(Continued)

*Primary Examiner* — Stewart Fraser
(74) *Attorney, Agent, or Firm* — Sughrue Mion, PLLC (57) ABSTRACT

An object of the present invention is to provide a cover that is made less prone to be removed even if receiving an impact due to falling or the like, and an operation for removing the cover is made easy. An engaging piece position regulating member made of a viscoelastic body such as an urethane-based resin is provided on a left side of an elastically-deformable engaging piece of a cover, which allows an engaging projection of the engaging piece to leave from an engaging hole when the cover is removed from a device casing by manual operation and inhibits the engaging projection of the engaging piece from leaving from the engaging hole when a rate of deformation larger than a rate of deformation by manual operation is provided to the engaging piece by an impact due to falling or the like.

7 Claims, 7 Drawing Sheets

(56) References Cited

FOREIGN PATENT DOCUMENTS

| JP | 8-293905 A | | 11/1996 |
|---|---|---|---|
| JP | 08293905 A | * | 11/1996 |
| JP | 10-069895 A | | 3/1998 |
| JP | 11-176402 A | | 7/1999 |
| JP | 2005-051300 A | | 2/2005 |
| JP | 2010-182603 A | | 8/2010 |

OTHER PUBLICATIONS

English Translation of JP-08293905A, Published 1996.*
Communication dated Dec. 1, 2014 from the State Intellectual Property Office of the People's Republic of China in counterpart application No. 201180055192.0.

* cited by examiner

LOCKING STRUCTURE FOR COVER

CROSS REFERENCE TO RELATED APPLICATIONS

This application is a National Stage of International Application No. PCT/JP2011/004790 filed Aug. 29, 2011, claiming priority based on Japanese Patent Application No. 2010-255910, filed Nov. 16, 2010, the contents of all of which are incorporated herein by reference in their entirety.

TECHNICAL FIELD

The present invention relates to a locking structure for a cover and, for example, relates to a locking structure for a cover formed of a battery cover or the like in a portable electronic device.

BACKGROUND ART

For example, in a conventional locking structure for a battery cover in a portable electronic device such as a portable phone, the battery cover is less prone to be removed with a battery accommodated in a device casing even if receiving an impact due to falling or the like and, on the other hand, the battery cover can be easily removed at the time of battery replacement (for example, refer to Patent Document 1).

In this conventional locking structure for a battery cover, when the battery cover is slid along a front surface of the device casing to be mounted on the device casing, an elastically-deformable engaging piece provided at a tip part of the battery cover is elastically deformed and is then elastically returned to be engaged with an engaging part provided inside the device casing. With this, the battery cover is made less prone to be removed even if receiving an impact due to falling or the like.

On the other hand, at the time of battery replacement, a plate-shaped elastic body provided at a portion on the front surface of the device casing corresponding to the engaging piece of the battery cover mounted on the device casing is pressed, thereby pressing down the engaging piece of the battery cover via this pressed plate-shaped elastic body to release the engagement of the engaging piece of the battery cover with the engaging part of the device casing. In this state, the battery cover is slid along the front surface of the device casing in a removing direction, thereby making the battery cover easily removable.

Patent Document 1: Japanese Laid-Open (Kokai) Publication No. Heisei 10-069895

SUMMARY OF THE INVENTION

Problem(S) to be Solved by the Invention

However, in the conventional locking structure for a battery cover, at the time of battery replacement, with the plate-shaped elastic body being pressed to release the engagement of the engaging piece of the battery cover with the engaging part of the device casing, the battery cover has to be slid along the front surface of the device casing. That is, two operations, the operation of pressing the plate-shaped elastic body and the operation of sliding the battery cover in the removing direction, have to be simultaneously performed, thereby posing a problem in which the operation of removing the battery cover is burdensome.

Thus, an object of the present invention is to provide a locking structure for a cover allowing the cover to be made less prone to be removed or opened even if receiving an impact by falling or the like and allowing an easy operation for removing or opening the cover.

Means for Solving the Problem

A locking structure for a cover according to the present invention includes a device casing; a cover mounted on the device casing so as to be removable or be able to be opened and closed, an engaging part provided to any one of the device casing and the cover, an elastically-deformable engaging piece provided to either one of the device casing and the cover and to be removably engaged with the engaging part, and an engaging piece position regulating member provided to the other and allowing the engaging piece to leave from the engaging part when the cover is removed from the device casing or opened by manual operation and inhibiting the engaging piece from leaving from the engaging part when a rate of deformation larger than a rate of deformation by the manual operation is provided to the engaging piece.

Effect of the Invention

According to the present invention, with the provision of the engaging piece position regulating member allowing the engaging piece to leave from the engaging part when the cover is removed from the device casing or opened by manual operation and inhibiting the engaging piece from leaving from the engaging part when a rate of deformation larger than a rate of deformation by the manual operation is provided to the engaging piece, the cover can be made less prone to be removed or opened even if receiving an impact due to falling or the like. Also, when the cover is removed or opened, all that is required is to perform an operation of only removing or opening the cover, thereby allowing an easy operation for removing or opening the cover.

BEST MODE FOR CARRYING OUT THE INVENTION (First Embodiment)

Figure 1:
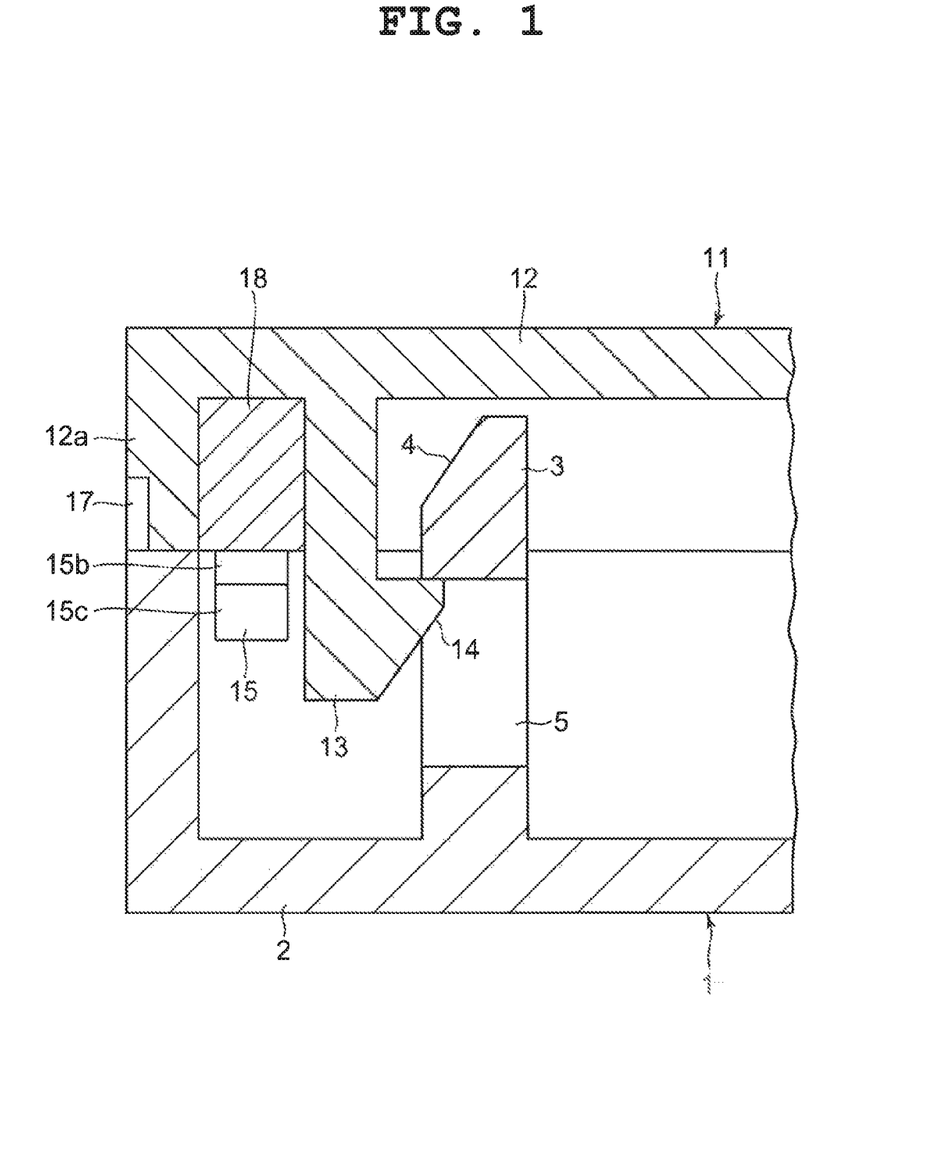
FIG. 1 is a sectional view of a locking structure part for a cover in a portable electronic device as a first embodiment of the present invention.
Figure 2:
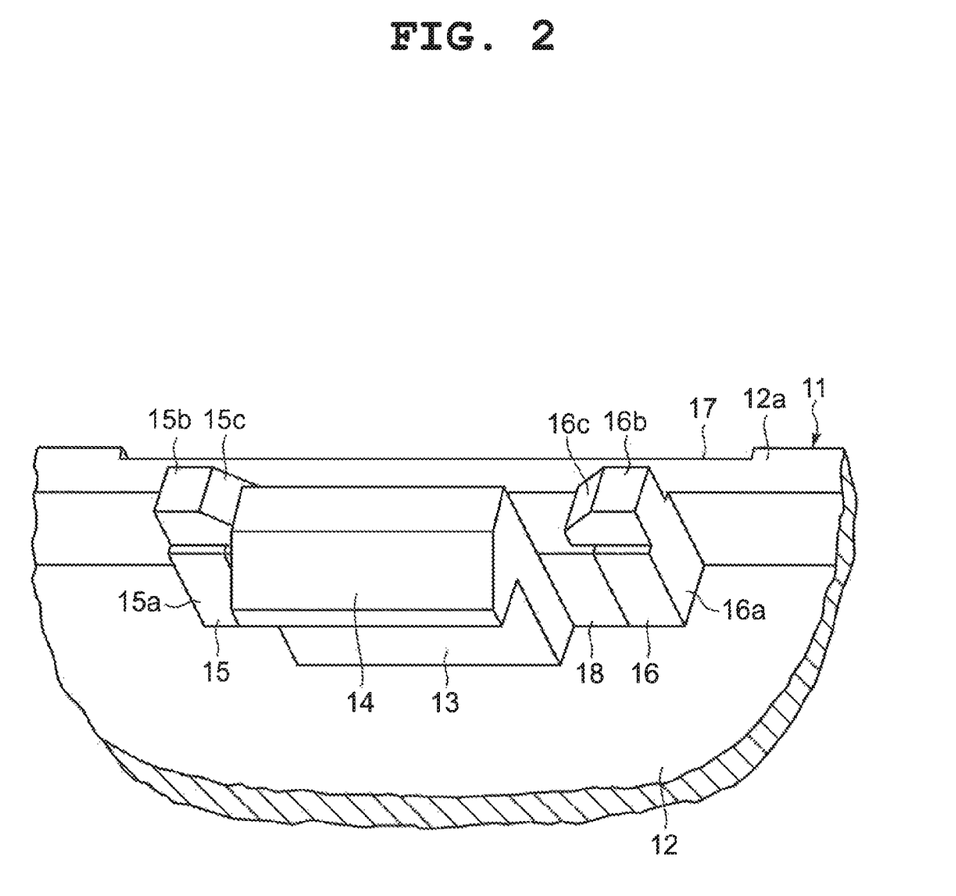
FIG. 2 is a perspective view of an engaging piece of the cover depicted in FIG. 1 when viewed from below.

FIG. 1 depicts a sectional view of a locking structure part for a cover in a portable electronic device as a first embodiment of the present invention, and FIG. 2 depicts a perspective view of an engaging piece of the cover depicted in FIG. 1 when viewed from below. In this portable electronic device, a cover 11 can be removably mounted on a device casing 1.

The device casing 1 is formed of resin, and includes a box-like casing main body 2 with its upper side open. The casing main body 2 has a bottom plate, an upper surface of which is provided with an engaging projection (engaging part) 3 approximately I-shaped in section at a predetermined position. The engaging projection 3 has an upper part with a left surface in FIG. 1 provided with an inclined surface 4. The engaging projection 3 has an intermediate part provided with a rectangular-shaped engaging hole 5 penetrating in a lateral direction in FIG. 1.

The cover 11 is formed of resin, and includes a box-like cover main body 12 with its lower side open. On a lower surface of the cover main body 12, an engaging piece 13 approximately L-shaped in section is provided near a predetermined side wall 12a of the cover main body 12, that is, at a portion corresponding to the engaging projection 3 of the device casing 1, so as to be elastically deformable. The engaging piece 13 has a lower part with a right surface in FIG. 1 provided with an inclined surface 14.

On an inner surface of the predetermined side wall 12a of the cover main body 12, positioning projections 15 and 16 are provided on both sides of the engaging piece 13. The positioning projections 15 and 16 include base parts 15a and 16a each having an approximately L-shaped section and provided on the inner surface of the predetermined side wall 12a of the cover main body 12 and also include tip parts 15b and 16b provided on center parts of lower surfaces (upper surfaces in FIG. 2) of these base parts 15a and 16a, respectively.

In this case, the tip parts 15b and 16b project to a lower side (an upper side in FIG. 2) of the predetermined side wall 12a of the cover main body 12. Also, the tip parts 15b and 16b partially project from the base parts 15a and 16a, respectively, each toward a side facing each other. The portions of the tip parts 15b and 16b projecting from the base parts 15a and 16a have lower surfaces (upper surfaces in FIG. 2) provided with inclined surfaces 15c and 16c, respectively. The predetermined side wall 12a of the cover main body 12 has an outer surface with its lower part (an upper part in FIG. 2) provided with a notched part 17 at a predetermined position for holding a human hand fingernail or the like.

In a cubic-shaped space surrounded by the engaging piece 13, the positioning projections 15 and 16, and the predetermined side wall 12a of the cover main body 12, a cubic-shaped engaging piece position regulating member 18 is provided. As will be described further below, the engaging piece position regulating member 18 allows the engaging piece 13 to leave from the engaging hole 5 of the engaging projection 3 when the cover 11 is removed from the device casing 1 by manual operation and inhibits the engaging projection 3 from leaving from the engaging hole 5 of the engaging projection 3 when a rate of deformation larger than that by the manual operation is applied to the engaging piece 13, and is made of, for example, a viscoelastic body such as a urethane-based resin or a silicon-based resin.

This engaging piece position regulating member 18 is mounted so as to be pressed into the cubic-shaped space surrounded by the engaging piece 13, the positioning projections 15 and 16, and the predetermined side wall 12a of the cover main body 12. In this state, the engaging piece position regulating member 18 is arranged on a left side of the engaging piece 13 in FIG. 1 (on a side in a direction in which the engaging piece 13 leaves from the engaging part 3). Also, the engaging piece position regulating member 18 is prevented from dropping by parts of the tip parts 15b and 16b projecting from the base parts 15a and 16a of the positioning projections 15 and 16 toward a side of facing each other.

Meanwhile, in the state depicted in FIG. 1, with a tip part of the engaging piece 13 of the cover 11 being engaged with the engaging hole 5 of the engaging projection 3 of the device casing 1, the cover 11 is mounted on an upper side of the device casing 1. In this state, the engaging piece position regulating member 18 is in an almost no-load state only with an elastically return force of its own acting.

To remove the cover 11 from this state, the cover 11 is lifted with a human hand fingernail or the like held in the notched part 17 of the cover 11, thereby providing the engaging piece 13 with a force of rotating in a clockwise direction about its base end. In this case, since the force provided to the engaging piece 13 is a force by manual operation, the rate of deformation of the engaging piece 13 in the clockwise direction is relatively slow, and the accompanying reaction force of the engaging piece position regulating member 18 is small due to its viscous property.

Figure 3:
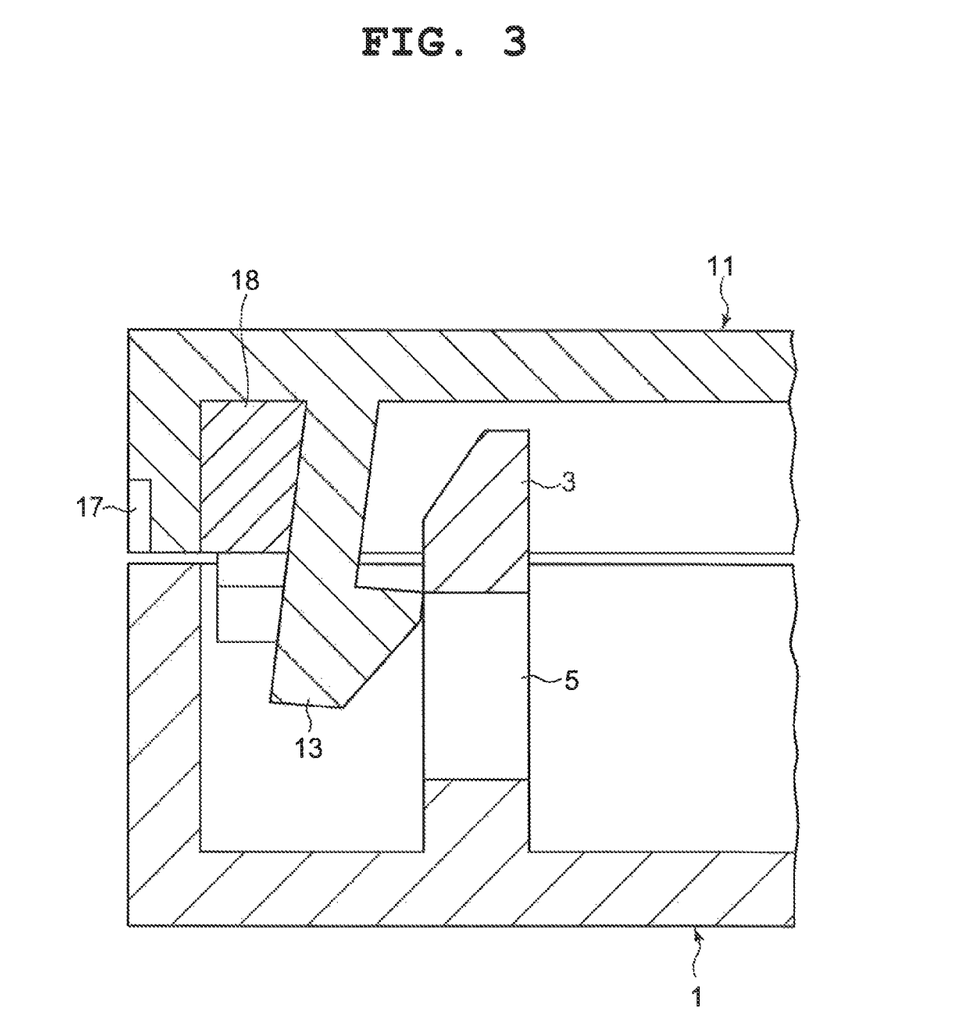
FIG. 3 is a sectional view similar to FIG. 1 for describing an initial state when the cover is removed.

As a result, as depicted in FIG. 3, the engaging piece position regulating member 18 allows the rotation of the engaging piece 13 in the clockwise direction and elastically deforms, thereby causing the engaging piece 13 to rotate in the clockwise direction and its tip part to leave from the engaging hole 5 of the engaging projection 3. With this, the cover 11 can be easily removed from the device casing 1. Furthermore, all that is required in this case is to perform an operation of only lifting the cover 11 with a human hand fingernail or the like held in the notched part 17 of the cover 11 to remove the cover 11, thereby allowing an easy operation for removing the cover 11.

On the other hand, in the state depicted in FIG. 1, when an impact is applied to the device casing 1 and others due to falling or the like, a rate of deformation larger than that by manual operation is applied to the engaging piece 13. Therefore, the rate of deformation of the engaging piece 13 in the clockwise direction becomes relatively fast, and the accompanying reaction force of the engaging piece position regulating member 18 is increased due to its viscous property. As a result, the engaging piece position regulating member 18 hardly elastically deforms and keeps its original shape, thereby inhibiting the rotation of the engaging piece 13 in the clockwise direction, inhibiting the tip part of the engaging piece 13 from leaving from the engaging hole 5 of the engaging projection 3, and keeping a locked state. With this, the cover 11 can be made less prone to be removed even if receiving an impact due to falling or the like.

(Second Embodiment)

Figure 4:
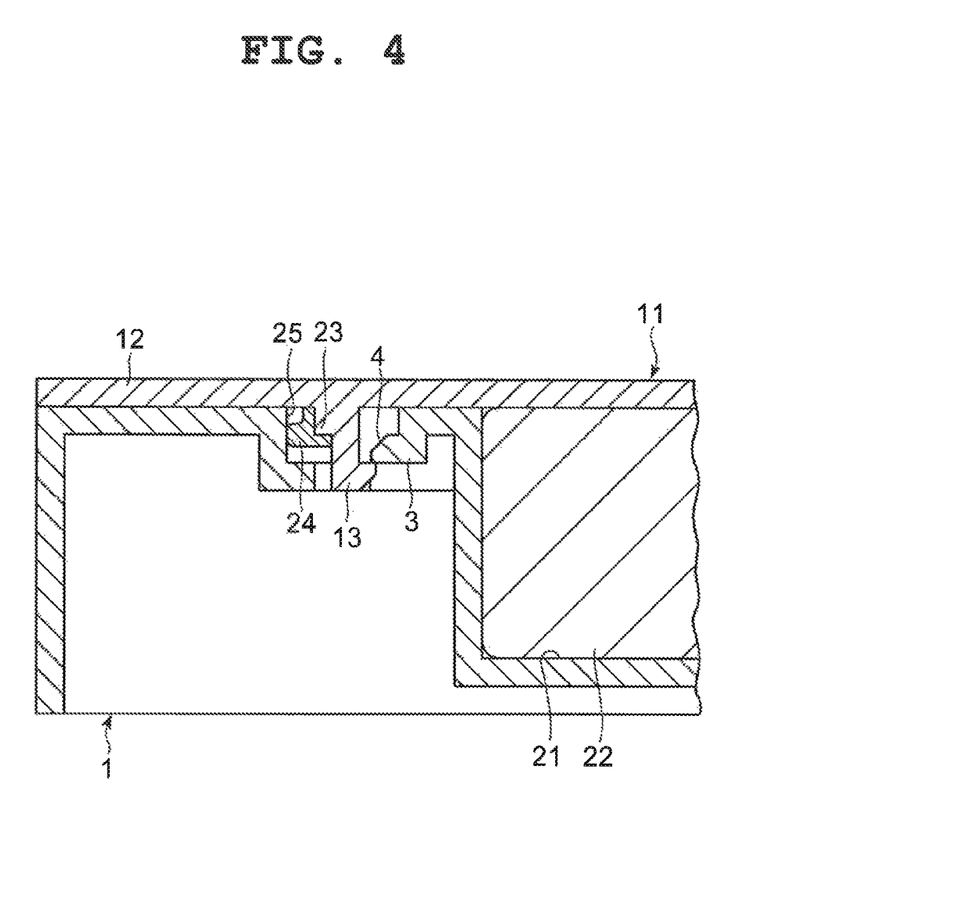
FIG. 4 is a sectional view of a locking structure part for a cover in a portable electronic device as a second embodiment of the present invention.
Figure 5:
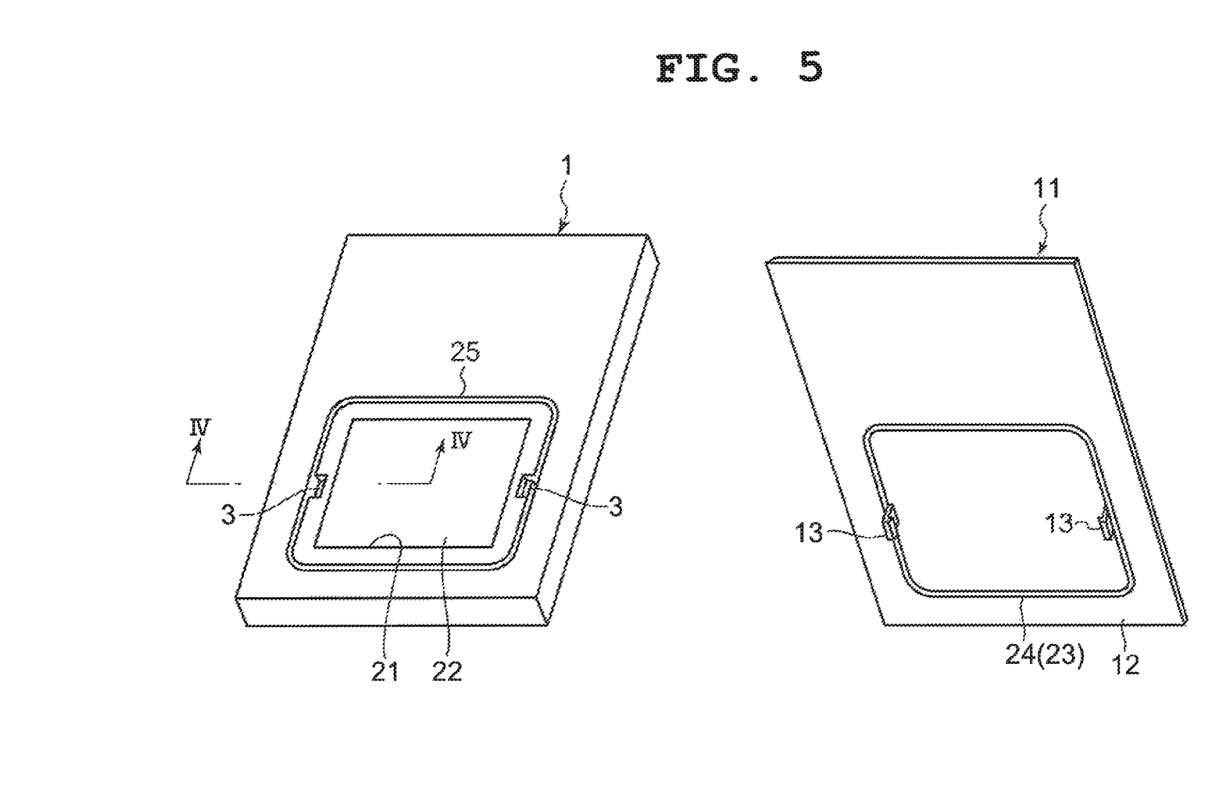
FIG. 5 is a partial perspective view in the state with the cover depicted in FIG. 4 removed.

FIG. 4 depicts a sectional view of a locking structure part for a cover in a portable electronic device as a second embodiment of the present invention, and FIG. 5 depicts a partial perspective view in the state with the cover depicted in FIG. 4 removed. In this case, FIG. 4 is a sectional view corresponding to a portion along a IV-IV line of FIG. 5.

In this portable electronic device, a significant difference from the portable electronic device depicted in FIG. 1 is that a ring-shaped sealing member 24 is provided with a function as an engaging piece position regulating member, the sealing member 24 made of a viscoelastic body such as silicon rubber and provided by integral molding around a projection 23 provided in a ring shape at a predetermined position on a lower surface of a cover 11 including base parts of engaging pieces 13 provided at predetermined two positions of the resin-made cover 11 for covering a battery 22 accommodated in a battery accommodation recessed part 21 of a device casing 1. In this case, a cover main body 12 of the cover 11 is in a plate shape. Also, engaging projections 3 provided at predetermined two positions of the device casing 1 are each formed of only a projection having an inclined surface 4 on an upper surface on a left side and each do not have an engaging hole 5.

As depicted in FIG. 4, in the state in which the cover 11 is mounted on the device casing 1, with the sealing member 24 pressed against a wall surface of a ring-shaped groove 25 provided around the battery accommodation recessed part 21 on an upper surface of the device casing 1, the battery accommodation recessed part 21 is made watertight. In this case, since the sealing member 24 is provided with a function as an engaging piece position regulating member, the number of components can be decreased.

(Third Embodiment)

Figure 6:
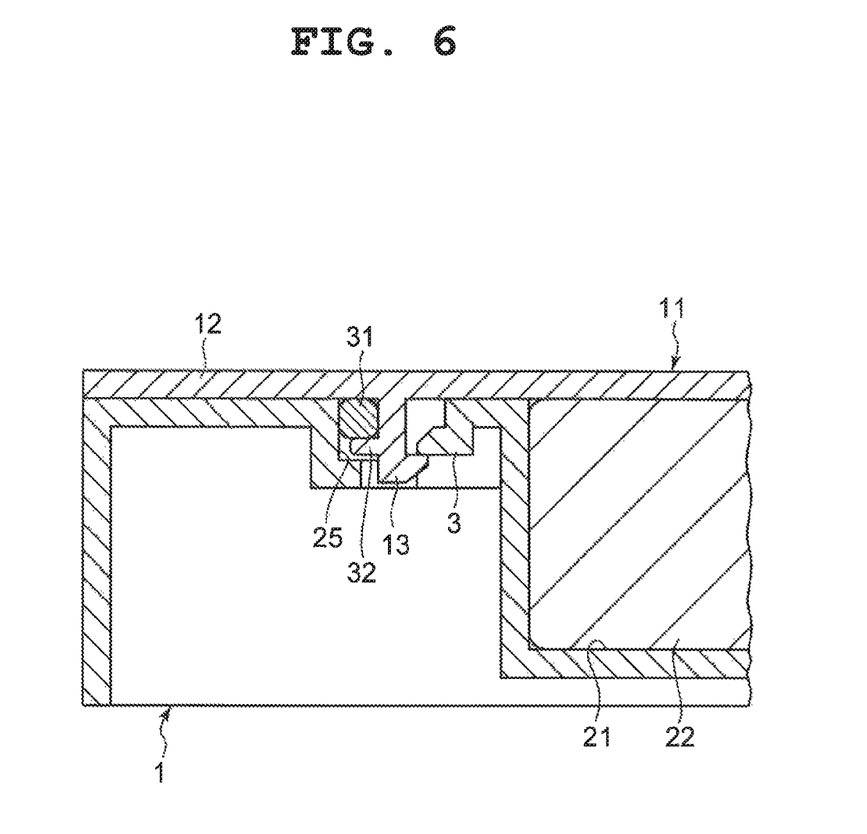
FIG. 6 is a sectional view of a locking structure part for a cover in a portable electronic device as a third embodiment of the present invention.
Figure 7:
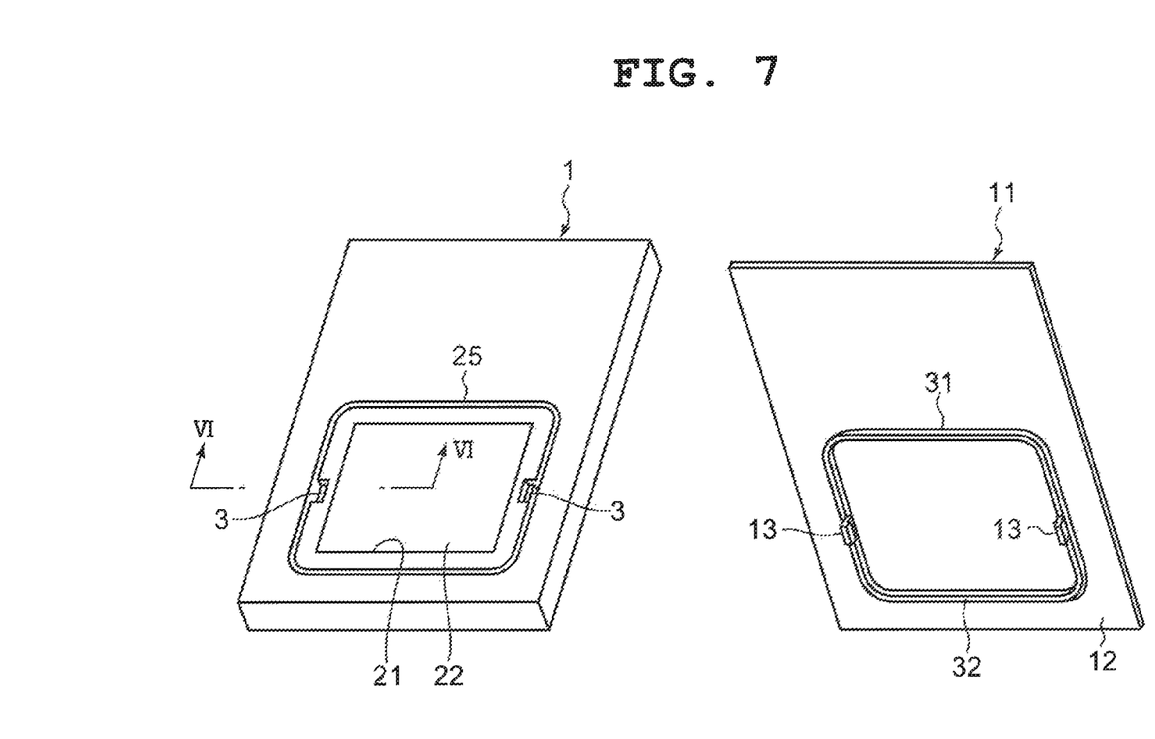
FIG. 7 is a partial perspective view in the state with the cover depicted in FIG. 6 removed.

FIG. 6 depicts a sectional view of a locking structure part for a cover in a portable electronic device as a third embodiment of the present invention, and FIG. 7 depicts a partial perspective view in the state with the cover depicted in FIG. 6 removed. In this case, FIG. 6 is a sectional view corresponding to a portion along a VI-VI line of FIG. 7.

In this portable electronic device, a difference from the portable electronic device depicted in FIG. 4 and FIG. 5 is that a sealing member 31 formed of an O ring is used in place of the sealing member 24 integrally molded with the cover 11. In this case, the sealing member 31 is mounted by being pressed into a space between a projection 32 approximately L-shaped in section and provided in a ring shape at a predetermined position on a lower surface of a cover main body 12 including a base part of an engaging piece 13 and the cover main body 12 facing the projection 32.

As depicted in FIG. 6, in the state in which the cover 11 is mounted on a device casing 1, with the sealing member 31 pressed against a wall surface of the ring-shaped groove 25 provided around a battery accommodation recessed part 21 on an upper surface of the device casing 1, the battery accommodation recessed part 21 is made watertight. Also in this case, since the sealing member 31 is provided with a function as an engaging piece position regulating member, the number of components can be decreased.

(Other Embodiments)

In the case as depicted in FIG. 1 and FIG. 2, the positioning projections 15 and 16 may be configured to have only the base parts 15a and 16a, respectively, and the cubic-shaped engaging piece position regulating member 18 may be mounted in a cubic-shaped space surrounded by the engaging piece 13, the positioning projections 15 and 16, and the predetermined side wall 12a of the cover main body 12 via a double sided adhesive tape, an adhesive agent, or the like.

Also, in the case as depicted in FIG. 1 and FIG. 2, as an engaging piece position regulating member, an elastically-deformable, hermetically-sealed bag in a cubic shape filled with a fluid, such as a dilatant fluid or a putty silicon bound fluid, having a property of sending back a small reaction force in response to a small stress and sending back a large reaction force in response to a large reaction force may be used. Also in this case, the positioning projections 15 and 16 may be configured to have only the base parts 15a and 16a, respectively, and the cubic-shaped hermetically-sealed bag may be mounted in a cubic-shaped space surrounded by the engaging piece 13, the positioning projections 15 and 16, and the predetermined side wall 12a of the cover main body 12 via a double sided adhesive tape, an adhesive agent, or the like.

Furthermore, for example, in the case as depicted in FIG. 1, the cover 11 may be mounted on a right side of the engaging projection 3 of the device casing 1 via a hinge so as to be able to be opened and closed (rotate), an external connection terminal for charging may be provided on a left side of the engaging projection 3 inside the device casing 1, and this external connection terminal may be protected with the cover 11. In this case, the engaging piece position regulating member 18 is to allow the engaging piece 13 from leaving from the engaging hole 5 of the engaging projection 3 when the cover 11 is put away to open the device casing 1 by manual operation and to inhibit the engaging piece 13 from leaving from the engaging hole 5 of the engaging projection 3 when a rate of deformation larger than that by manual operation is provided to the engaging piece 13.

Still further, while it has been described in each of the above embodiments that the engaging projection 3 is provided to the device casing 1 and the engaging piece 13 and the engaging piece position regulating member 18 (including the sealing members 24 and 31) are provided to the cover 11, the inverse will suffice. That is, the engaging piece 13 and the engaging piece position regulating member 18 (including the sealing members 24 and 31) may be provided to the device casing 1, and the engaging projection 3 may be provided to the cover 11.

The whole part of the exemplary embodiments disclosed above can be described as, but not limited to, the following supplementary notes.

LIST OF REFERENCE NUMERALS 1 device casing
2 casing main body
3 engaging projection (engaging part)
5 engaging hole
11 cover
12 cover main body
13 engaging piece
15, 16 positioning projections
18 engaging piece position regulating member
21 battery accommodation recessed part
22 battery
23 projection
24 sealing member
25 groove
31 sealing member
32 projection

The invention claimed is:
1. A cover lock structure comprising:
a device casing;
a cover mounted on the device casing so as to be removable or be able to be opened and closed;
an engaging part provided to any one of the device casing and the cover;
an elastically-deformable engaging piece provided to either one of the device casing and the cover and to be removably engaged with the engaging part; and
an engaging piece position regulating member provided to the other of the device casing and the cover which is not provided with the elastically-deformable engaging piece and allowing the engaging piece to leave from the engaging part when the cover is removed from the device casing or opened by manual operation and inhibiting the engaging piece from leaving from the engaging part when a rate of deformation larger than a rate of deformation by the manual operation is provided to the engaging piece,
wherein the engaging piece position regulating member is provided to the other of the device casing and the cover which is not provided with the elastically-deformable engaging piece on a direction side in which the engaging piece leaves from the engaging part, and wherein the engaging piece position regulating member includes any of a viscoelastic body, a dilatant fluid, and a putty silicon bound fluid.

2. The cover lock structure according to claim 1, wherein the cover is to cover a battery accommodated in a battery accommodation recessed part of the device casing.

3. The cover lock structure according to claim 2, wherein the engaging piece position regulating member is formed of a ring-shaped sealing member provided to a portion corresponding to a portion around the battery accommodation recessed part of the device casing on a face of the other facing the one.

4. The cover lock structure according to claim 3, wherein the sealing member is formed of a member integrally molded around a ring-shaped projection provided to the face of the other facing the one and including the engaging piece.

5. The cover lock structure according to claim 3, wherein the sealing member is formed of an O ring to be pressed into a space between a ring-shaped projection having an L-shaped section provided to the face of the other facing the one and including the engaging piece and the other face facing the projection.

6. The cover lock structure according to claim 1, wherein in a state in which the cover is put on the device casing or the device casing is closed with the cover, the sealing member is pressed against a wall surface of a ring-shaped groove provided to a face of the one facing the other.

7. The cover lock structure according to claim 1, wherein the cover is to protect an external connection terminal provided inside the device casing.

* * * * *